N. S. HARRYMAN.
Wheel-Cultivator.
No. 34,362.
Patented Feb. 11, 1862.
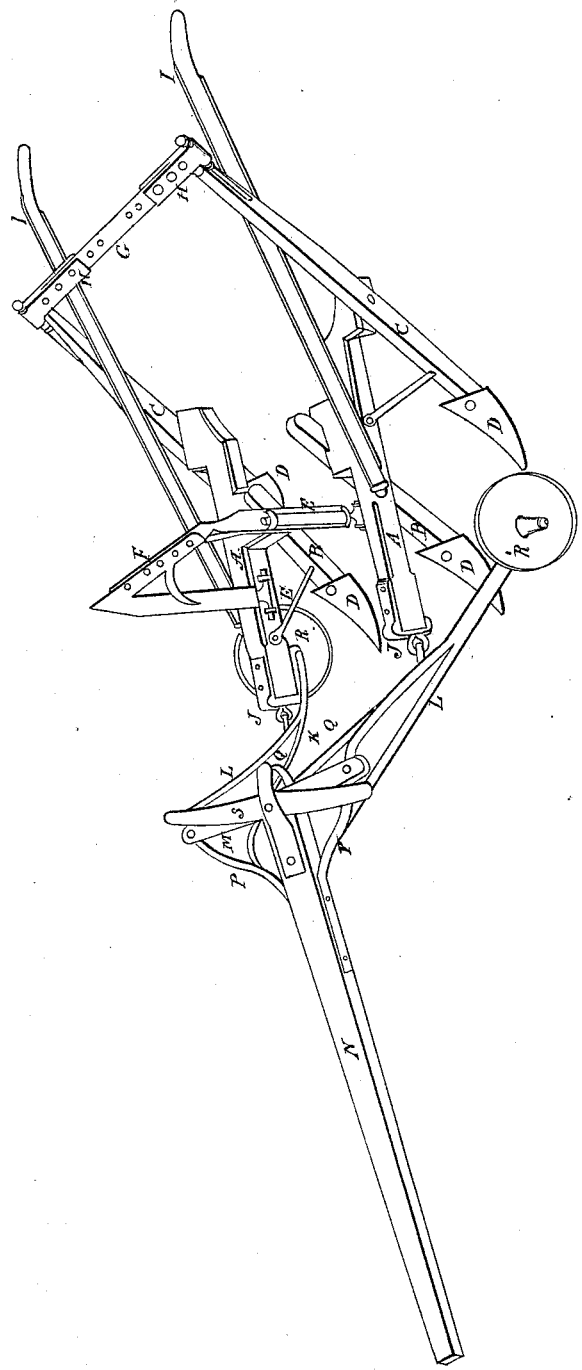
Witnesses:
Charles Hadaway
Thomas H. Ridgate
Inventor:
Newton S. Harryman
By his Atty
J. Denver Jr

UNITED STATES PATENT OFFICE.

NEWTON S. HARRYMAN, OF FRANKFORT, INDIANA.

IMPROVEMENT IN CULTIVATORS.

Specification forming part of Letters Patent No. 34,362, dated February 11, 1862.

*To all whom it may concern:*

Be it known that I, NEWTON S. HARRYMAN, of Frankfort, in the county of Clinton and State of Indiana, have invented a new, useful, and Improved Cultivating-Plow; and I do hereby declare that the same is described and represented in the following specification and drawing.

To enable others skilled in the art to make and use my invention, I will proceed to describe its construction and the mode of using it, referring to the drawing, which is a perspective view of my improved cultivating-plow.

The nature of my invention and improvement in cultivating-plows consist in the combination and arrangement of devices hereinafter described.

In the accompanying drawing, A A are the beams of the plows, made in the form shown. To these beams the front standards, B B, and the rear standards, C C, are fastened and braced, as shown in the drawing, and the triangular cultivator-plates D D are fastened to the lower ends of these standards. There are two standards, E E, hinged to the beams A A, as shown in the drawing, which standards extend up through ears on the sides of the frame F, and in which ears they turn freely, so as to allow the beams or plows to swing or vibrate freely on the frame F, which frame is made in the form shown in the drawing, so as to pass over the tops of the crops as the plows pass on each side of the row of corn or other plants. The top bar of the frame F is made in two parts, and may be provided with a series of holes, so as to be shortened or extended to set the plows nearer together or farther apart, and adjust them to suit the crops being cultivated. Each part of the top bar of the frame F is braced to one of the sides of the frame. The rear standards, C C, extend above the beams, and are provided with pivots for the ends of the bar G, which forms the rear connection between the plows, as shown in the drawing. These pivots turn freely in the ends of the bar G, which bar is hinged or jointed at H H. It is also made in two parts, with a series of holes, so that it may be shortened or lengthened when required. The handles I I form a part of the rear standards, C C, which are fastened to the beams A A, as shown in drawing. The beams A A are provided with clevises J J, which are connected by links to the draft-frame K, as shown in the drawing.

The draft-frame K may be made in the form shown. It consists of the arms L L, bar M, and pole N, firmly fastened together and stayed or supported by the braces Q Q, and the lower ends of the arms L L terminate in pivots, on which the wheels R R turn that support and carry the rear ends of the draft-frame, as shown in the drawing. The fore end of the tongue or pole N is supported and carried by the animals which draw the plow, which animals may be harnessed to the pole N and single-tree S in some convenient manner. The clevises are linked to the draft-frame, and the standards E are hinged to the beams and turn freely in the ears of the frame F, and the bar G is jointed, and its ends turn freely on pivots, so as to allow the plows to swing and vibrate with great freedom of action. The middle of the draft-frame and the bars of the frame F and the bar G are all arranged so high that the plows may be worked on each side of a row of corn or cane which is not more than three or four feet high.

I believe I have described and represented my improvements in cultivating-plows so as to enable any person skilled in the art to make and use them.

I will now state what I desire to secure by Letters Patent, to wit:

The combination of the several parts, constructed and arranged as described, to wit: the bar G, pivoted to the top of the rear standards, the frame F, and standards E E, with the draft-frame, as shown in the drawing.

NEWTON S. HARRYMAN.

Witnesses:
 ISAAC COOK,
 JAMES N. SIMS.